(12) United States Patent
Gebert et al.

(10) Patent No.: US 9,944,170 B2
(45) Date of Patent: Apr. 17, 2018

(54) OPERATING FLUID CONTAINER HAVING A STIFFENING ELEMENT

(71) Applicant: KAUTEX TEXTRON GMBH & CO., KG, Bonn (DE)

(72) Inventors: Klaus Gebert, Willich (DE); Ulrich Karsch, Niederkassel (DE); Burkhard Marxen, Sankt Augustin (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 89 days.

(21) Appl. No.: 14/908,840

(22) PCT Filed: Jul. 8, 2014

(86) PCT No.: PCT/EP2014/064595
§ 371 (c)(1),
(2) Date: Jan. 29, 2016

(87) PCT Pub. No.: WO2015/014581
PCT Pub. Date: Feb. 5, 2015

(65) Prior Publication Data
US 2016/0167506 A1 Jun. 16, 2016

(30) Foreign Application Priority Data

Jul. 31, 2013 (DE) .................. 10 2013 012 687

(51) Int. Cl.
*B60K 15/03* (2006.01)
(52) U.S. Cl.
CPC ..... *B60K 15/03177* (2013.01); *B60K 2015/0346* (2013.01); *B60K 2015/03217* (2013.01);
(Continued)

(58) Field of Classification Search
CPC .... B60K 15/03177; B60K 2015/03243; B60K 2015/0346
(Continued)

(56) References Cited

U.S. PATENT DOCUMENTS

| 4,590,964 A * | 5/1986 | Beardmore | B67D 7/68 137/565.24 |
| 6,176,260 B1 * | 1/2001 | Hahner | B60K 15/077 123/468 |

(Continued)

FOREIGN PATENT DOCUMENTS

| EP | 2497622 A2 | 9/2012 |
| JP | 2011-093408 | 5/2011 |

(Continued)

OTHER PUBLICATIONS

English language PCT International Search Report and Written Opinion mailed Nov. 27, 2014, received in corresponding PCT Application No. PCT/EP14/64595, 11 pgs.

(Continued)

*Primary Examiner* — Jacob D Knutson
(74) *Attorney, Agent, or Firm* — Grossman, Tucker, Perreault & Pfleger, PLLC

(57) ABSTRACT

The present invention discloses an operating fluid container (10) made of thermoplastic material for a motor vehicle and a method for equipping an operating fluid container with a stiffening element (20). The operating fluid container (10) here has the following features:
the operating fluid container (10) has a container opening (12) which is arranged in a container wall (11) and is edged by a surround (13);
the operating fluid container (10) comprises at least one fastening device (15), which is arranged in the operating fluid container (10) and is connected to a container base (14) located opposite the container opening (12);

(Continued)

Figure 1:
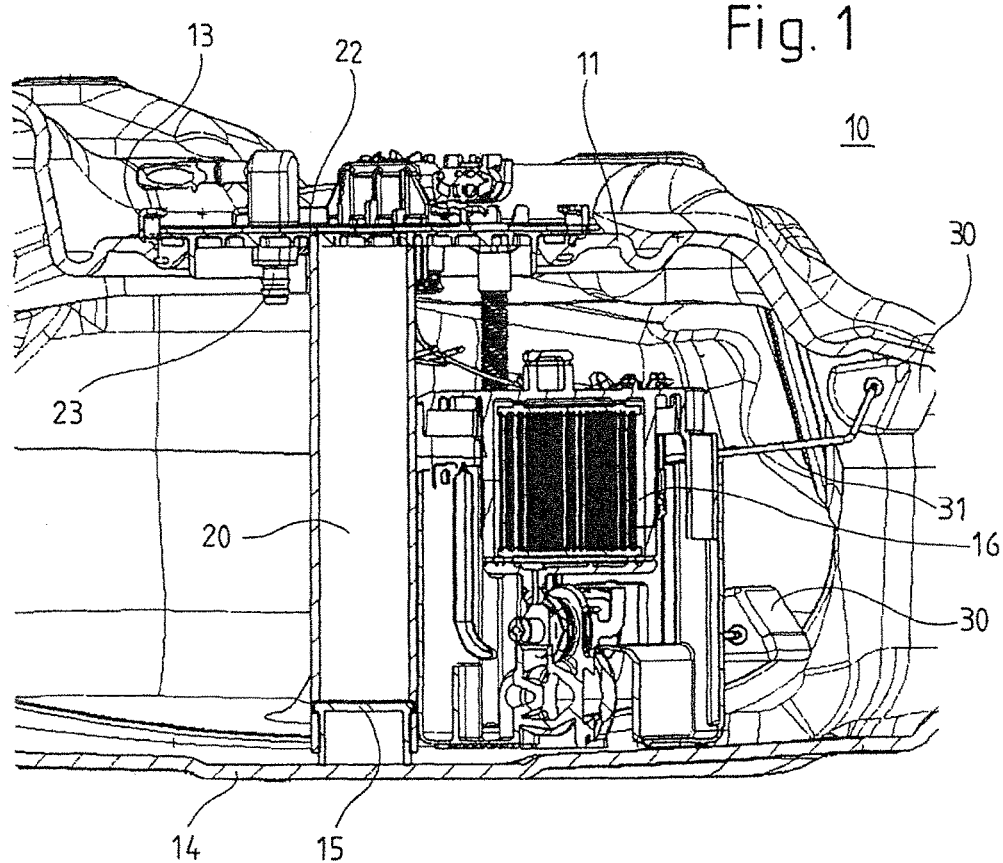

the operating fluid container (10) further comprises a stiffening element (20), which is connectable and/or connected to a closure element (22) for closing the container opening (12) and is connectable to the fastening device (15); and the stiffening element (20) which is fastened to the container base (14) by means of the fastening device (15) and to the container wall by means of the closure element (22) counteracts deformation caused by the internal pressure of the operating fluid container (10).

9 Claims, 2 Drawing Sheets

(52) U.S. Cl.
CPC ............ *B60K 2015/03243* (2013.01); *B60K 2015/03453* (2013.01); *B60K 2015/03467* (2013.01)

(58) Field of Classification Search
USPC ....... 280/834; 137/590, 565.37, 592, 565.24, 137/574; 123/468, 469; 417/363
See application file for complete search history.

(56) References Cited

U.S. PATENT DOCUMENTS

| | | | |
|---|---|---|---|
| 7,059,305 B2* | 6/2006 | Knaggs | B60K 15/03519 123/509 |
| 7,117,856 B2* | 10/2006 | Honda | B60K 15/077 123/509 |
| 9,056,546 B2 | 6/2015 | Gebert et al. | |
| 2008/0006625 A1* | 1/2008 | Borchert | B29C 65/609 220/4.13 |
| 2009/0206097 A1 | 8/2009 | Gebert et al. | |
| 2011/0139128 A1* | 6/2011 | Zhang | F02M 37/103 123/509 |
| 2014/0305936 A1 | 10/2014 | Gebert et al. | |

FOREIGN PATENT DOCUMENTS

| | | |
|---|---|---|
| WO | 2010023267 A1 | 3/2010 |
| WO | 2012139961 A1 | 10/2012 |
| WO | 2012139962 A1 | 10/2012 |

OTHER PUBLICATIONS

English language PCT International Preliminary Report on Patentability dated Jul. 17, 2015, received in corresponding PCT Application No. PCT/EP14/64595, 5 pgs.

\* cited by examiner

OPERATING FLUID CONTAINER HAVING A STIFFENING ELEMENT

The invention relates to an operating fluid container made of thermoplastic material for a motor vehicle.

Furthermore, the present invention relates to a method for producing an operating fluid container (10) made of thermoplastic material for a motor vehicle.

Moreover, the present invention relates to a method for equipping an operating fluid container, having a container opening edged by a surround, with a stiffening element.

In the case of motor vehicles having an internal combustion engine, when an operating fluid container, in particular the fuel container, is subjected to heat, the operating fluid, e.g. the fuel, is likewise heated, such that the vapor pressure of the operating fluid increases and the operating fluid container is subjected to a corresponding internal pressure. Operating fluid containers, in particular in the form of fuel containers, have reduced rigidity in the region of their inspection opening. As a result of the application of pressure as described above, the fuel container is consequently subjected to increased deformation in the region of the inspection opening.

For the ventilation of an operating fluid container in the form of a fuel container, the latter is fluidically connected to an activated carbon filter to filter out fuel vapors. The activated carbon filter is flushed by means of intake air during operation of the internal combustion engine, such that fuel vapors bound in the activated carbon can be fed to the internal combustion engine. The absorption capacity of the activated carbon filter can be limited on account of the flushing process using intake air.

In the case of hybrid motor vehicles, there is furthermore a further problem caused by the reduced operating time of the internal combustion engine. On account of the reduced operating time of the internal combustion engine, an activated carbon filter which is fluidically connected to the fuel container undergoes correspondingly less flushing, and therefore it is also the case that less fuel vapor bound in the activated carbon can be flushed out. This in turn has the effect that activated carbon filters for hybrid motor vehicles have to have larger dimensions. Furthermore, through the ventilation of the fuel container via the activated carbon filter, more fuel is converted into the vapor phase, and therefore it would be advantageous to design the fuel container to be stiffer and/or more pressure-resistant.

It is known from the prior art to stiffen the fuel container using coils and/or stiffening elements inside the fuel container. Coiled fuel containers are however complex in production and therefore costly. Moreover, an effectively coilable geometry limits the degree of configuration freedom in the design and therefore the utilizable volume.

US 2011/0139129 A1 describes an operating fluid container comprising a stiffening element, in which a fluid conveying unit is arranged, wherein the fluid conveying unit is fixed to the stiffening element. The stiffening element is connected with one bottom wall of the tank by a fastening device. Therefore, the positioning of the fluid conveying device is restricted by the positioning of the stiffening element. Moreover, since the fluid conveying unit is inserted into the stiffening element, the stiffening element has to exhibit a certain diameter so that the insertion of the stiffening element into the tank is quite complicated since the stiffening element has to be inserted into the tank in a tilted way US 2009/0206097 A1 discloses a thermoplastic fuel tank for motor vehicles comprising at least one stiffening element within the fuel tank, wherein the stiffening element extends between two opposite tank walls in such a manner that it counteracts deformation caused by internal pressure of the fuel tank. Two ends of the stiffening element are arranged within the fuel tank and engage behind the tank wall from the outside.

WO 2012/139962 A1 discloses a fuel tank having two opposite wall portions and at least one reinforcing element connecting these two wall portions. The reinforcing element comprises a pillar which is connected with two end sections via which the reinforcing element is connected to the opposite wall portions of the fuel tank. Thereby, the two end sections of the reinforcing element are welded with the inner faces of the tank wall.

EP 2 497 622 A2 describes a structure and a method for clamping built-in components in a hollow container. A built-in component, e.g. a conduit, is clamped by a first support member and a second support member, wherein the first support member is secured to an inner wall surface of a first half of the container and the second support member is secured to an inner wall surface of a second half of the container. Thereby, the first and second support members exhibit base surfaces which are formed with hook portions. The hook portions are provided for letting material of the molten parison flow into it. Thereby, a positive connection between the parison and the support members is realized.

The object on which the present invention is based is that of providing an improved operating fluid container which does not have the aforementioned disadvantages of conventional operating fluid containers.

This object is achieved by an operating fluid container having the features indicated in claim 1. Advantageous configurations are described in the claims dependent thereon.

Furthermore, the present invention is based on the object of providing a method for equipping an operating fluid container, having a container opening edged by a surround, with a stiffening element.

This object is achieved by a method having the features indicated in claim 11.

An operating fluid container according to the invention has a container opening which is arranged in a container wall and is edged by a surround. Furthermore, the operating fluid container comprises at least one fastening device, which is arranged in the operating fluid container and is connected to a container base located opposite the container opening. Moreover, the operating fluid container further comprises a stiffening element, which is connectable and/or connected to a closure element for closing the container opening and is connectable to the fastening device. In this case, the stiffening element which is fastened to the container base by means of the fastening device and to the container wall by means of the closure element counteracts deformation caused by the internal pressure of the operating fluid container.

The stiffening element can also be referred to as a supporting element or as a tie rod. The container wall can also be referred to as the tank upper shell and the container base can also be referred to as the tank base. The connections between the stiffening element and the fastening device and between the closure element and the container wall can in each case be in the form of a screwed connection, bayonet connection, plug-in connection, snap-fit connection, clamping connection or latching connection.

The operating fluid container according to the invention consequently has an increased rigidity in the region of the container opening, in particular in the region of the inspection opening, and therefore the dimensional stability of the operating fluid container is ensured even in the region of the inspection opening despite the application of pressure from inside. As a result, it is possible to subject the operating fluid container to a relatively large internal pressure without the latter losing its shape. As a result, processes for the ventilation of the operating fluid container, in particular of an operating fluid container in the form of a fuel container, can in turn be reduced. In particular in the case of hybrid vehicles, the ventilation processes can be avoided as the vehicle is being driven by way of its electric motor and can be scheduled for the operating time in which the motor vehicle is being driven by means of its internal combustion engine. On account of the reduced processes for the ventilation of the operating fluid container, an activated carbon filter which is fluidically connected to the operating fluid container can have a smaller configuration, since it can be dimensioned for a smaller quantity of fuel vapor. On account of the smaller number of ventilation processes, an increased vapor pressure remains inside the fuel container, and therefore more fuel does not unnecessarily pass into the vapor phase during a ventilation process.

A correspondingly formed operating fluid container in the form of a fuel container is suitable in particular for hybrid motor vehicles, since in the case of hybrid motor vehicles the activated carbon filter which is fluidically connected to the fuel container is flushed to a lesser extent by intake air on account of the reduced operating time of the internal combustion engine. Since the fuel container according to the invention can withstand a relatively high internal pressure, it is the case that, as already described above, the ventilation of the fuel container does not have to be provided as often as is the case for fuel containers known from the prior art. It is therefore possible to reduce the absorption capacity and thus the volume and therefore the size of the activated carbon filter.

It is preferable that at least one fluid line and/or at least one electrical line are guided through the closure element.

This has the advantage that an operating fluid container without a stiffening element can be exchanged by means of a stiffening element which is connected or is connectable to a closure element, such that the rigidity of the operating fluid container can be increased.

It is preferable that the stiffening element has a tubular configuration. A stiffening element of tubular configuration is particularly simple and consequently inexpensive to produce.

It is preferable that the stiffening element has longitudinal recesses along the axial longitudinal extent thereof.

In this respect, the maximum transferable tensile force between the container base and the container wall can be set by way of the number of longitudinal recesses, which can also be referred to as slots, and by way of the widthwise extents of the slots. Predetermined breaking points can therefore be introduced into the stiffening element in a targeted manner, this having a positive effect in particular on the crash behavior of the operating fluid container. The length of the longitudinal recesses can be used to set the ratio between transferable tensile stress and shear rigidity of the stiffening element. The minimum web width or the maximum web length is in this respect limited by the buckling under negative pressure loading. A negative pressure inside the operating fluid container can be caused, for example, by a reduction in the temperature of the surroundings or by the conveyance of the operating fluid.

The longitudinal recesses can furthermore serve for flooding the hollow space of the stiffening element, such that the volume of the operating fluid container can be utilized optimally. As an alternative and/or in addition to the longitudinal recesses, provision can also be made of other openings in the stiffening element.

Furthermore, the predetermined breaking point/the predetermined breaking points can be realized in a different manner. For example, the wall thickness of the stiffening element can be reduced at a desired location. It would also be possible to provide a perforation in the circumferential direction of the stiffening element, said perforation reducing the tensile load-bearing capacity at this location.

It is preferable that a filling level sensor is arranged inside the stiffening element. This filling level sensor can be realized, for example, as an immersion tube by means of ultrasonics, capacitively or by means of a lever-type sensor. A correspondingly formed operating fluid container optimally utilizes the available volume despite an increase in the rigidity. It is preferable that the operating fluid container further comprises a further fastening device connected to the container base and a fluid conveying unit, which is connectable and/or connected to the container base by means of the further fastening device.

It is preferable that the operating fluid container comprises a baseplate, which in turn comprises the fastening device. A correspondingly formed operating fluid container is particularly simple to produce, since the baseplate can be connected to the container base using connection techniques which are known from the prior art. By way of example, the baseplate can be welded to the container base. As an alternative thereto, the baseplate can be connected to the container base by way of a riveted connection. By way of example, the baseplate can be provided with openings, through which warm-plastic material of the container base penetrates when the baseplate is pressed onto the still warm-plastic preform, such that this solidified material forms a riveted connection.

Furthermore, the object on which the invention is based is achieved by a method for equipping an operating fluid container with a stiffening element, the operating fluid container having a container opening edged by a surround. Here, the method comprises the following method steps:

inserting a fastening device via the container opening into the operating fluid container;
connecting the fastening device to a container base lying opposite the container opening;
inserting the stiffening element via the container opening into the operating fluid container; and
connecting the stiffening element to the fastening device and to the container wall by means of the closure element.

Finally, the object on which the invention is based is also achieved by a method for equipping an operating fluid container with a stiffening element, the operating fluid container having a container opening edged by a surround and a fastening device connected to a container base and lying opposite the container opening. Here, the method comprises the following method steps:

inserting the stiffening element via the container opening into the operating fluid container; and
connecting the stiffening element to the fastening device and to the container wall by means of the closure element.

Figure 2:
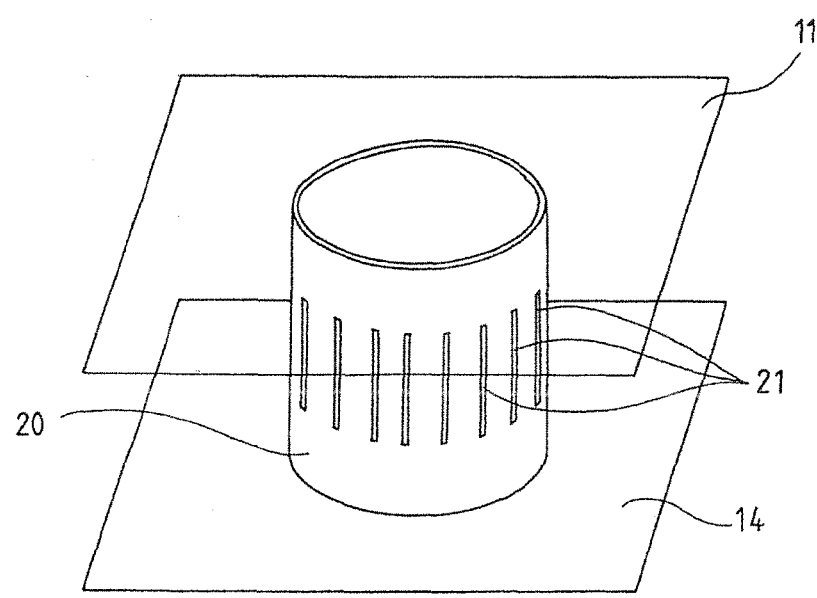
Figure 3:
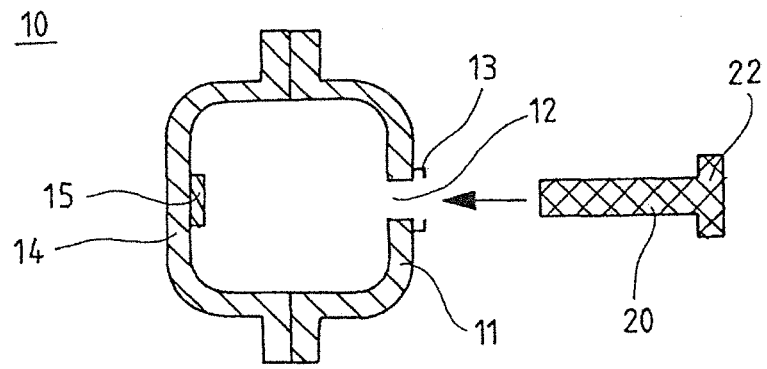
Figure 4:
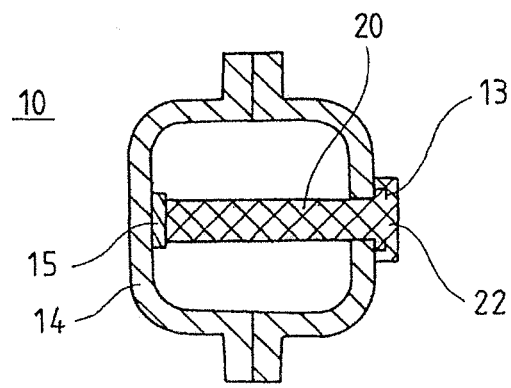

Further advantages, details and features of the invention become apparent hereinbelow from the exemplary embodiments explained. In detail:

FIG. 1: shows a cross-sectional illustration of an operating fluid container according to the invention in the form of a fuel container;

FIG. 2: shows a schematic illustration of a stiffening element which is connected to a container base and to a container wall and has longitudinal recesses that produce predetermined breaking points;

FIG. 3: shows a schematic cross-sectional illustration of the operating fluid container according to the invention before it is equipped with a stiffening element; and FIG. 4: shows the operating fluid container illustrated in FIG. 3 with a stiffening element connected thereto.

In the description which now follows, the same reference signs denote the same components or the same features, and therefore a description which is made with respect to one figure in relation to a component also applies to the other figures, such that a repetitive description is avoided.

FIG. 1 shows a cross section of the operating fluid container 10 according to the invention in the form of a fuel container 10. The fuel container 10 is produced from a thermoplastic material and is intended for a motor vehicle. The operating fluid container 10 has a tank lower shell 14 or a container base 14 and a tank upper shell 11 or a container wall 11, by means of which the fuel container is delimited in each case. The fuel container 10 has a container opening 12 which is arranged in the container wall 11 and is edged by a surround 13, the container opening 12 being apparent more clearly from FIG. 3. Furthermore, the fuel container 10 comprises a fastening device 15 in the form of a bayonet connection 15, this being arranged in the fuel container 10 and being connected to the container base 14. In this case, the bayonet connection 15 is arranged lying opposite the container opening 12.

Moreover, the fuel container 10 comprises a stiffening element 20 in the form of a stiffening tube 20. The stiffening element 20 is connected to a closure element 22, which is in the form of a housing cover 22, for closing the container opening 12 and is configured so as to be connectable to the fastening device 15 in the form of the bayonet connection 15. The closure element 22 is in this case connected to the container wall 11 or to the surround 13 by means of a closure device (not shown in the figures) in the form of a closure ring.

It is clear from FIG. 1 that a fluid line 23, through which for example a fuel can be conveyed to the outside of the fuel container 10, is provided in the cover 22.

For conveying the fuel to the outside via the fluid line 23, a fluid conveying unit 16 likewise connected to the container base 14 is furthermore provided in the fuel container 10.

Although it is not shown in FIG. 1, the fuel container 10 can comprise a baseplate which is connected to the container base 14. The baseplate in turn can comprise two fastening devices, specifically a fastening device for fastening the stiffening element 20 and a further fastening device for fastening the fluid conveying unit 16. Moreover, a filling level sensor is arranged in the fluid container, two floats 30 of the filling level sensor being visible in FIG. 1. The floats 30 are connected to the actual filling level sensor via a connecting rod 31.

Moreover, electrical lines, which cannot be seen in FIG. 1 and through which, for example, the fluid conveying unit can be supplied with power and controlled therewith, are guided through the cover 22.

It can be seen from FIG. 1 that the stiffening element 20 is connected to the container base 14 by means of the fastening device 15 and to the container wall 11 by means of the closure element 22. On account of the connection of the stiffening element 20 both to the container wall 11 and to the container base 14, said stiffening element counteracts deformation caused by the internal pressure of the fuel container 10.

FIG. 2 schematically shows a stiffening element 20 connected to the container base 14 and the container wall 11. The stiffening element 20 here has recesses 21 in its wall along the axial longitudinal extent thereof. In the exemplary embodiment shown, the recesses 21 are realized as longitudinal recesses 21. However, the recesses 21 can also have in each case any other desired geometry.

The maximum tensile force which is transferable by the stiffening element 20 can be set by way of the number of longitudinal recesses 21 and by way of the widthwise extent thereof. Predetermined breaking points of the stiffening element 20 can thus be introduced into the reinforcing element 20 in a targeted manner.

Furthermore, the length of the longitudinal recesses 21 can be used to set the ratio between transferable tensile stress and shear rigidity of the stiffening element 20. The minimum web width or the maximum web length is in this respect limited by the buckling under negative pressure loading.

In addition to the longitudinal recesses 21, provision can be made of at least one additional recess (not shown in FIG. 2) which is preferably arranged beneath the longitudinal recesses 21 in the installed position. The additional recess serves to fluidically connect the operating container inner space to the stiffening element inner space, such that the volume of the stiffening element 20 can likewise be effectively utilized for the operating fluid. Alternatively, at least one of the recesses 21 can also extend further in the direction of the container base 14.

FIG. 3 shows a schematic cross-sectional illustration of an operating fluid container 10 or fuel container 10, in which the stiffening element 20 has not yet been connected to the container base 14 and the container wall 11. It is apparent in the exemplary embodiment shown that the stiffening element 20 is formed in one piece with the closure element 22. However, the actual stiffening element 20 and the closure element 22 can of course also be configured in two pieces and in a manner connectable to one another. As already described above, the stiffening element 20 can be connected to the fastening device 15 by a bayonet connection, for example. The closure element 22 is connected to the operating fluid container 10 by means of a closure device (not shown in the figures) in the form of a closure ring. The fastening ring is in this case placed over the closure element 22 and connected to the operating fluid container 10 by means of the surround 13. The closure element 22 is arranged between the closure ring and the container opening 12 and is pressed by means of the closure ring against the container wall 11 surrounding the container opening 12. A sealing device (not shown) which is known from the prior art is placed between the closure element 22 and the container wall 11. The connection between the closure ring and the surround can be in the form of a screwed connection, bayonet connection, plug-in connection, snap-fit connection, clamping connection or latching connection.

The operating fluid container 10 can be produced in a known manner, for example by means of blow molding or injection molding. Then, a container opening 12 is produced in the fuel container 10, for example by cutting out a circle. The fastening device 15 can be introduced into the operating fluid container 10 through the container opening 12 and can then be connected to the container base 14 by adhesive bonding, welding, riveting or another method. The stiffening element 20 is then inserted into the fuel container 10 via the container opening 12. Finally, the stiffening element 20 is connected to the fastening device 15 and to the container wall 11 by means of the closure element 22.

The container base 14 and the container wall 11 are drawn toward one another by the stiffening element 20, and therefore the fuel container 10 should have a greater extent in terms of its tank height than the stiffening element 20. In the case of an excessively small tank height, the tank would not be closable or would be closable only with great effort.

LIST OF REFERENCE SIGNS

10 Operating fluid container/fuel container
11 Container wall/tank upper shell
12 Container opening
13 Surround (of the container opening)
14 Container base/tank lower shell
15 Fastening device/baseplate
16 Fluid conveying unit
20 Stiffening element
21 Recess/longitudinal recess (in the stiffening element)
22 Closure element/cover
23 Fluid line (through the closure element)
30 Float (of a filling level sensor/lever-type sensor)
31 Rod (of a filling level sensor/lever-type sensor)

What is claimed is:

1. An operating fluid container for a motor vehicle, comprising:
   the operating fluid container is made of thermoplastic material;
   the operating fluid container has a container opening which is arranged in a container wall and is edged by a surround;
   the operating fluid container comprises at least one fastening device, which is arranged in the operating fluid container and is connected to a container base located opposite the container opening;
   the operating fluid container further comprises a stiffening element, which is connectable and connected to a closure element for closing the container opening and is connectable to the fastening device;
   the stiffening element is fastened to the container base by the fastening device and to the container wall by the closure element, and configured to counteract deformation from internal pressure within the operating fluid container,
   wherein the operating fluid container further comprises a further fastening device connected to the container base and a fluid conveying unit, which is connectable and connected to the container base by means of the further fastening device.

2. The operating fluid container as claimed in claim 1, wherein at least one fluid line and/or at least one electrical line is guided through the closure element.

3. The operating fluid container as claimed in claim 1, wherein the stiffening element has a tubular configuration.

4. The operating fluid container as claimed in claim 1, wherein the stiffening element has recesses along an axial longitudinal extent thereof.

5. The operating fluid container as claimed in claim 1, wherein a filling level sensor is arranged inside the stiffening element.

6. The operating fluid container as claimed in claim 1, wherein the operating fluid container comprises a baseplate, which comprises the fastening device.

7. The operating fluid container according to claim 6, wherein the baseplate further comprises the further fastening device.

8. The operating fluid container as claimed in claim 1, wherein the fastening device is welded to the container base.

9. The operating fluid container as claimed in claim 1, wherein the fastening device is riveted to the container base.

* * * * *